United States Patent
Scholl et al.

(12)

(10) Patent No.: US 6,365,668 B1
(45) Date of Patent: Apr. 2, 2002

(54) RUBBER COMPOUNDS CONTAINING SOLUTION RUBBERS WHICH CONTAIN CARBOXYL GROUPS

(75) Inventors: Thomas Scholl, Bergisch Gladbach; Jürgen Trimbach, Köln, both of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/434,616

(22) Filed: Nov. 5, 1999

(30) Foreign Application Priority Data

Nov. 16, 1998 (DE) .......................... 198 52 648

(51) Int. Cl.⁷ ................................ C08L 9/00
(52) U.S. Cl. ....................................... 524/575
(58) Field of Search ........................... 524/575

(56) References Cited

U.S. PATENT DOCUMENTS 4,412,031 A   10/1983   Kitahara et al. ............ 524/526
5,189,109 A   2/1993    Imai et al. .................. 525/296
5,227,425 A   7/1993    Rauline ...................... 524/493
5,250,630 A   10/1993   Oshima et al. .............. 125/301
5,409,969 A   4/1995    Hamada ...................... 523/213
5,496,883 A   3/1996    Hamada ...................... 524/492
6,111,045 A * 8/2000    Takagishi ................... 526/338

FOREIGN PATENT DOCUMENTS

CA   1121099   3/1982
GB    933749   8/1963
GB   1179252   1/1970
GB   1575115   9/1980

* cited by examiner

Primary Examiner—Paul R. Michl
(74) Attorney, Agent, or Firm—Joseph C. Gil; Noland J. Cheung

(57) ABSTRACT

This invention is directed to rubber compounds which amongst other constituents contain fillers and contain solution rubbers which contain carboxyl groups, are particularly suitable for the production of highly reinforced rubber moldings, particularly for the production of tires which exhibit particularly high wet slip resistance and abrasion-resistance.

8 Claims, No Drawings

US 6,365,668 B1

RUBBER COMPOUNDS CONTAINING SOLUTION RUBBERS WHICH CONTAIN CARBOXYL GROUPS

FIELD OF THE INVENTION

The present invention relates to rubber compounds which contain fillers and which contain solution rubbers which contain carboxyl groups, to the production of the above-mentioned rubber compounds; and to the use thereof for the production of vulcanized rubber materials which are particularly suitable for the production of highly reinforced rubber moldings, most preferably for the production of tires which exhibit particularly high wet slip resistance and abrasion-resistance.

SUMMARY OF THE INVENTION

Anionically polymerized solution rubbers which contain double bonds, such as solution polybutadiene and solution styrene/butadiene rubbers, have advantages compared with corresponding emulsion rubbers for the production of tire treads which exhibit low rolling resistance. These advantages comprise, amongst others, the feasibility of controlling the vinyl content and the glass transition temperature which is associated therewith, and of controlling the extent of molecular branching. This results in particular advantages in practical use which are related to the wet grip and rolling resistance of the tire. Thus, U.S. Pat. No. 5,227,425 describes the production of tire treads from a solution of SBR rubber and hydrated silica. Numerous methods of modifying the terminal groups have been developed in order to achieve a further improvement in properties. Examples of methods such as these include those described in EP-A 334 042, which employs modification with dimethylaminopropylacrylamide, or that described in EP-A 447,066, which employs modification with silyl ethers. However, the proportion by weight of terminal groups is small due to the high molecular weight of rubbers, and is, therefore, only capable of exerting a slight influence on the interaction between the filler and the rubber molecule. One object of the present invention, amongst others, was to produce solution rubbers comprising a significantly higher content of groups which are effective for interaction with the filler.

A process for the production of solution polybutadiene rubbers which contain carboxyl groups (3.9 to 8.9% by weight) is described, amongst other features, in DE-OS 2,653,144. However, due to their strength, which is too low, and due to their acceptable stress values, which are likewise too low, these rubbers are not suitable as the major component in tire treads.

SUMMARY OF THE INVENTION

The object of the present invention was, therefore, to provide rubber compounds comprising solution rubbers containing carboxyl groups, from which tires can be produced which exhibit improved wet grip and a lower rolling resistance, as well as a high mechanical strength and improved abrasion properties.

DETAILED DESCRIPTION OF THE INVENTION

The present invention, therefore, relates to rubber compounds which consist of at least one rubber and of 10 to 500 parts by weight, preferably 20 to 200 parts by weight, of a filler with respect to 100 parts by weight rubber, wherein the rubber has been produced by the polymerization of aromatic vinyl monomers with diolefins in solution and by the introduction of carboxyl groups, said rubber has a content of 0.1 to 3% by weight of bound carboxyl groups or salts thereof, a content of aromatic vinyl monomers incorporated by polymerization of 5 to 40% by weight, and a content of diolefins of 60 to 95% by weight, wherein the content of 1,2-bonded diolefins (vinyl content) is 5 to 60% by weight, with respect to the solution rubber used in each case.

Rubber compounds according to the present invention, which are preferred, are those in which the rubber constituent has a content of bound carboxyl groups or salts thereof of 0.2 to 2.5% by weight, a content of aromatic vinyl monomers incorporated by polymerization of 5 to 30% by weight, and a content of diolefins of 70 to 95% by weight, wherein the content of 1,2-bonded diolefins (vinyl content) falls within the range from 5 to 55% by weight.

Examples of aromatic vinyl monomers which can be used for polymerization include styrene, o-, m- and p-methylstyrene, p-tert.-butylstyrene, α-methylstyrene, vinylnaphthalene, divinylbenzene, trivinylbenzene and/or divinylnaphthalene. Styrene is most preferably used.

Examples of diolefins which can be used according to the invention for polymerization include 1,3-butadiene, isoprene, 1,3-pentadiene, 2,3-dimethylbutadiene, 1-phenyl-1,3-butadiene and/or 1,3-hexadiene. 1,3-butadiene and isoprene are most preferably used.

The rubbers which can be used according to the invention in the rubber compounds and which. are based on aromatic vinyl monomers and diolefins with a content of 0.1 to 3% by weight of bound carboxyl groups, have average molecular weights (number average) of 50,000 to 2,000,000, preferably 100,000 to 1,000,000, and glass transition temperatures of −50° C. to +20° C., preferably −40° C. to 0C., and have Mooney viscosities ML 1+4 (100° C.) of 10 to 200, preferably 30 to 150.

In addition to carboxyl groups the rubbers of the invention may contain other functional groups like hydroxyl-, carboxylic ester-, carboxamide- or sulfonic acid groups.

Production of the rubbers which are used according to the invention is effected by anionic solution polymerization, i.e., by means of a catalyst based on an alkali metal, e.g., n-butyllithium, in an inert hydrocarbon as the solvent. The known randomizing agents and control agents for the microstructure of the polymer can be used in addition. Anionic solution polymerization methods of this type are known and are described, for example, by I. Franta in Elastomers and Rubber Compounding Materials; Elsevier 1989, pages 73–74, 92–94, and in Houben-Weyl, Methoden der Organische Chemie, Thieme Verlag, Stuttgart, 1987, Volume E 20, pages 114–134.

The carboxyl groups can be introduced into the rubber either by adding chemical compounds which supply carboxyl groups, for example, $CO_2$, to the metal-containing solution, or by treating the finished rubber in a subsequent reaction with chemical compounds which contain carboxyl groups, for example with mercaptans which contain carboxyl groups.

The carboxyl group content can be determined by known methods, e.g. titration of the free carboxylic acid, spectroscopy or elemental analysis and others.

The carboxyl groups are preferably introduced into the rubber after the completion of the solution polymerization of the monomers used, by the reaction of the polymers obtained, optionally in the presence of radical initiators, with carboxylmercaptans of formula

HS-R'-COOX, wherein

R' represents a linear, branched or cyclic $C_1$–$C_{36}$ alkylene group which may optionally be substituted with up to 3 further carboxyl groups or which can be interrupted by nitrogen, oxygen or sulfur atoms, and X represents hydrogen or represents a metal or an, optionally substituted with Cl–C36-alkyl-, cycloalkyl- or arylgroups, ammonium ion.

The preferred carboxylmercaptans are thioglycolic acid, 2-mercaptopropionic acid (thiolactic acid), 3-mercaptopropionic acid, 4-mercaptobutyric acid, mercaptoundecanoic acid, mercaptooctadecanoic acid, 2-mercaptosuccinic acid and alkali, alkaline earth or ammonium salts thereof. 2-and 3-mercaptopropionic acid, mercaptobutyric acid and 2-mercaptosuccinic acid, or the lithium, sodium, potassium, magnesium, calcium or ammonium salts thereof, are more preferably used. 3-mercaptopropionic acid or the lithium, sodium, potassium, magnesium, calcium or ammonium, ethylammonium, diethylammonium-, triethylammonium-, octadecylammonium-, and cyclohexylammonium-salts thereof are most preferably used.

In general, the reaction of the carboxylmercaptans with the solution rubbers is conducted in a solvent, for example, in hydrocarbons such as pentane, hexane, cyclohexane, benzene and/or toluene, at temperatures from 40 to 150° C., in the presence of radical initiators, e.g., peroxides, especially acylperoxides, such as dilauroyl peroxide and dibenzoylperoxide and ketalperoxides as di-tert.-butyltrimethylcyclohexaneperoxide, azo initiators such as azo-bis-isobutyronitrile, or benzpinacol silyl ethers, or in the presence of photoinitiators and visible or UV light.

The amount of carboxylmercaptans which are used depends on the content of bound carboxyl groups or salts thereof in the solution rubber which is to be used in the rubber compounds.

Carboxylic acid salts can also be produced by the neutralization of the carboxylic acid groups, after the introduction thereof into the rubber.

Suitable fillers for the rubber compounds according to the invention include all known fillers which are used in the rubber industry, comprising both active and inactive fillers. Examples thereof Include:

microdispersed hydrated silicas, for example those produced by precipitation from solutions of silicates or by the flame hydrolysis of silicon halides with specific surfaces of 5–1000, preferably 20–400 m$^2$/g (BET specific surface) and with primary particle sizes of 10–400 nm. These hydrated silicas can optionally also be present as mixed oxides with other metal oxides such as Al, Mg, Ca, Ba, Zn, Zr or Ti oxides;

synthetic silicates, such as aluminum silicate, or alkaline earth silicates, such as magnesium silicate or calcium silicate, with BET specific surfaces of 20–400 m$^2$/g and primary particle diameters of 10–400 rim;

natural silicates, such as kaolin and other naturally occurring hydrated silicas;

glass fibers and glass fiber products (mat, strand) or glass microspheres;

metal oxides such as zinc oxide, calcium oxide, magnesium oxide or aluminum oxide;

metal carbonates such as magnesium carbonate, calcium carbonate or zinc carbonate;

metal hydroxides, such as aluminum hydroxide or magnesium hydroxide for example;

carbon blacks. The carbon blacks which are used here are produced by the flame black, furnace black or gas black processes and have BET specific surfaces of 20–200 m$^2$/g, e.g., SAF, ISAF, HAF, FEF or GPF carbon blacks;

rubber gels, particularly those based on polybutadiene, butadiene/styrene copolymers, butadiene/acrylonitrile copolymers and polychloroprene.

Microdispersed hydrated silicas and/or carbon blacks are preferably used as fillers.

The aforementioned fillers can be used on their own or in admixture. In one particularly preferred embodiment, the rubber compounds contain, as fillers, a mixture of light fillers, such as microdispersed hydrated silicas, and carbon blacks, wherein the mixture ratio of light fillers to carbon blacks ranges from 0.05 to 20, preferably from 0.1 to 10.

In addition to said solution rubbers which contain carboxyl groups, the rubber compounds according to the invention may also contain other rubbers, such as natural rubber and other synthetic rubbers also.

The preferred synthetic rubbers are described, for example, by W. Hofmann in Kautschuk-technologie, Gentner Verlag, Stuttgart 1980, and by I. Franta in Elasto-mers and Rubber Compounding Materials, Elsevier, Amsterdam 1989. Amongst other materials, they comprise:

BR—polybutadiene

ABR—butadiene/acrylic acid $C_{1-4}$ alkyl ester copolymers

CR polychloroprene

IR—polyisoprene

SBR—styreneibutadiene copolymers with styrene contents of 1–60, preferably 20–50% by weight IIR—isobutylene/isoprene copolymers NBR—butadiene/acrylonitrile copolymers with acrylonitrile contents of 5–60, preferably 10–40% by weight HNBR—partially hydrogenated or completely hydrogenated NBR rubbers EPDM—ethylene/propylene/diene copolymers as well as mixtures of these rubbers. Rubbers, which are of particular interest for the production of motor vehicle tires, and which contain surface-modified fillers, include emulsion SBRs and solution SBR rubbers with a glass transition temperature above— 50° C., which can optionally be modified with silyl ethers or other functional groups according to EP-A 447,066, polybutadiene rubbers which have a high 1,4-cis content (>90%) and which have been produced using catalysts based on Ni, Co, Ti or Nd, as well as polybutadiene rubbers with a vinyl content of up to 75%, and mixtures thereof.

The rubber compounds according to the present invention may also of course contain other rubber additives, which are employed, for example, for the crosslinking of the vulcanized rubbers produced from the rubber compounds, or which improve the physical properties, for special purposes, of vulcanized rubbers produced from the rubber compounds according to the present invention.

As crosslinking agents are used particularly sulfur or chemical compounds which supply sulfur. In addition, and as mentioned above, the rubber compounds according to the present invention may contain other additives, such as known reaction accelerators, anti-aging agents, heat stabilizers, light stabilizers, ozone stabilizers, processing aids, plasticizers, tackifiers, foaming agents, colorants, pigments, waxes, extenders, organic acids, retarders, metal oxides and activators.

These rubber additives according to the present invention are used in the customary known amounts, wherein the amount used depends on the subsequent purpose of use of the rubber compounds. The amounts of rubber additives usually fall within the range from 2 to 70 parts by weight with respect to 100 parts by weight of rubber, for example.

As mentioned above, additional rubbers apart from the solution rubber which contains carboxyl groups can also be admixed with the rubber compounds according to the invention. The amount of said additional rubbers usually falls within the range from 0.5 to 70, preferably 10 to 50% by weight, with respect to the total amount of rubber in the rubber compound. The amount of rubbers which are added in addition again depends on the respective purpose of use of the rubber compounds according to the present invention.

The use of additional filler activators is particularly advantageous for the rubber compounds according to the invention, which are filled with highly active hydrated silicas. The preferred filler activators are sulphur-containing silyl ethers, particularly bis-(trialkoxysilyl-alkyl) polysulphides such as those described in DE 2,141,159 and DE 2,255,577. Other suitable filler activators include oligomeric and/or polymeric sulphur-containing silyl ethers corresponding to the description in DE 4,435,311 and EP 670, 347. Other substances which can be used include mercapatoalkyl-trialk-oxysilanes, particularly mercaptopropyltriethoxysilane and thiocyanatoalkyl silyl ethers (see DE 19,544,469) and aminogroup-containing silylethers, like 3-amino-propyl-triethoxisilane and N-oleyl-N-propyl-trimethoxisilane. The filler activators are used in customary amounts, i.e., in amounts of 0.1 to 15 parts by weight with respect to 100 parts by weight rubber.

The rubber compounds according to the present invention can be produced, for example, by mixing the solution rubbers, which contain carboxyl groups with the corresponding fillers in suitable mixing apparatuses such as kneaders, rollers or extruders.

The rubber compounds according to the present invention are preferably produced by first polymerizing said monomers in solution, by introducing the carboxyl groups into the solution rubber, and after the completion of the polymerization and of the introduction of the carboxyl groups, by mixing the solution rubber, which is present in the corresponding solvent, with the corresponding fillers and optionally with further rubbers and further additives in the corresponding amounts and simultaneously or subsequently removing the solvent with hot water and/or steam at temperatures of 50 to 200° C., optionally under vacuum.

The present invention further relates to the use of the rubber compounds according to the invention for the production of vulcanized rubbers, which in turn are employed for the production of highly reinforced rubber moldings, particularly for the production of tires.

The invention is further illustrated but is not intended to be limited by the following examples in which all parts and percentages are by weight unless otherwise specified.

EXAMPLES

Example 1

A solution of 45 kg solution SBR rubber Buna VSL VP KA 8808 (Bayer AG, content of bound styrene 20% by weight) in 275 kg cyclohexane was treated at 80° C. with 0.563 kg 3-mercaptopropionic acid and 0.045 kg dilauroylperoxide. The batch was subsequently stirred for 2 hours at 80° C. 0.23 kg stabilizer Vulkanox 4020 (Bayer AG) and 17.12 kg aromatic oil Mobilsol K (Mobil) were then added thereto and the solvent was removed by steam distillation. After drying at 70° C. under vacuum an oil extended rubber, containing 37.5 phr mineraloil, was obtained. Mooneyviscosity ML 1+4 (10° C.) 38. Carboxyl content 0.5 wt. % (based on rubber).

Example 2

A solution of 500 g solution SBR rubber, Buna VSL 5025-0 (Bayer AG, content of bound styrene 25% by weight, content of 1,2-bonded butadiene 50% by weight) in 4 liters cyclohexane was treated at 80° C. with 6.25 g 3-mercaptopropionic acid and 0.25 g dilauroyl peroxide. The batch was subsequently stirred for 5 hours at 80° C. 2.5 g of Vulkanoxe®4020 stabilizer (Bayer AG) were then added thereto and the solvent was removed by steam distillation. After drying at 70° C. under vacuum, 508 g of a colorless rubber were obtained which had a Mooney viscosity ML 1+4 (1 00° C.) of 65. Carboxyl content: 0.5% by weight.

Examples 3–7:

The procedure was as in Example 1, except that the following mercaptans were used:

| Example | Buna VSL 5025-0 | Carboxylmercaptane | Initiator | ML 1 + 4 | carboxyl content in rubber |
|---|---|---|---|---|---|
| 3 | 500 g | 3.2 g 3-mercaptopropionic acid | 0.25 g dilauroyl peroxide | 61 | 0.27 wt. % |
| 4 | 500 g | 12.5 g 3-mercaptopropionic acid | 0.25 g dilauroyl peroxide | 81 | 1.1 wt. % |
| 5 | 500 g | 25 g 3-mercaptopropionic acid | 0.25 g dilauroyl peroxide | 103 | 2.1 wt. % |
| 6 | 500 g | 25 g 2-mercaptopropionic acid | 1.5 g dilauroyl peroxide | 107 | 2.1 wt. % |
| 7 | 500 g | 12.5 g 2-mercaptosuccinic acid | 1 g dilauroyl peroxide | 85 | 1.5% by weight |

Example 8

Solution Rubber with Ammoniumcarboxylate Groups

A solution of 500 g solution SBR rubber Buna VSL 5025-0 (Bayer AG, content of styrene 25% by weight) in 4l cyclohexane was treated at 80° C. with 6.25 g 3-opropionic acid and 0.5 g dilauroylperoxide. The batch was subsequently for 2 hours at 80° C. 2.5 g stabilizer Vulkanox 4020 (Bayer AG) and 6.94 g of on of 26 wt. % ammonia in water were then added thereto and stirred for 10 at 45° C. Then the solvent was removed by steam distillation. After drying at 70° C. under vacuum a rubber was obtained with mooneyviscosity ML 1+4 (100° C.) boxyl content 0.5 wt. % in the form of ammonium salt.

Compartive Example 9

Preparation of a Carboxylgroup Containing Emulsion-SBR

A solution of 500 g emulsion-SBR Krylene 1502 (Bayer AG, content of bound styrene 23,5% weight) in 4l cyclohexane was treated at 80° C. with 6.25 g 3-mercaptopropionic acid and three times with a portion of 0.5 g dilauroylperoxide in 2 hour intervals. Total reaction time was 8 hours at 80° C. 2.5 g stabilizer Vulkanox 4020 (Bayer AG) were then added thereto and the solvent was removed by steam distillation. After drying at 70° C. under vacuum a rubber was obtained with mooneyviscosity ML 1+4 (100° C.) 114 and a carboxyl content 0.5 wt. %.

Example 10

Production of a master batch from precipitated hydrated silica and a solution SBR rubber containing carboxyl groups:

Using the procedure as in Example 1500 g of Buna VSL 5025-0 solution SBR rubber in 4 liters cyclohexane was reacted at 80° C. with 6.25 g 3-mercaptopropionic acid and 0.25 g dilauroyl peroxide. Time of reaction: 5 hours. 2.5 g Vulkanox®4020 stabilizer (Bayer AG), 189.5 g of Renopale 450 aromatic mineral oil (Fuchs Mineralolwerke) and 405 g of Vulkasil® S highly active, precipitated hydrated silica (N2 specific surface about 180 m²/g, Bayer AG) were then added at 75° C. with stirring, and the batch was subsequently stirred for about 30 minutes until a uniform distribution was achieved at this temperature. The solvent was subsequently removed by the introduction of steam. The reaction vessel was heated externally at 75–80° C. in the course of this procedure. Thereafter, the moist solid was removed and filtered off from the finely divided hydrated silica through a sieve, and was then dried at 65° C. under vacuum. 1095 g of a brown hydrated silica/rubber master batch were obtained (99.2% theoretical). The waste water was free from hydrated silica.

Comparative Example 10a

The procedure used in Example 7 was applied here, except that a solution of 500 g of Buna VSL 5025-0 solution SBR rubber and 2.5 g Vulkanox® 4020 in 4 liters cyclohexane was mixed at 75° C. with 400 g of Vulkasil® 5 highly active precipitated hydrated silica. The solvent was subsequently removed by the introduction of steam. The reaction vessel was heated externally at 75–80° C. in the course of this procedure. Thereafter, the moist solid was removed and filtered off from the finely divided hydrated silica through a sieve, and was then dried at 65° C. under vacuum. 596 g of an inhomogeneous hydrated silica/rubber master batch were obtained (66% theoretical). The waste water contained large amounts of hydrated silica (about 75% of the amount used).

Example 11

The following substances were mixed in a 1.5 liter kneader (speed of rotation 60 rpm, filling ratio 65%, initial temperature 70° C., duration: 5 minutes). The mixtures were subsequently removed and sulphur and accelerator were admixed on a roller at a roller temperature of 40° C.:

| Mixture Constituents: | Comparison 11.A | Comparison 11.B | Example 11.1 | Comparison 11.C | Example 11.2 |
|---|---|---|---|---|---|
| the following were mixed in the 1.5 l kneader: | | | | | |
| solution-SBR Buna VSL 5025-1 (Bayer AG) | 70 | 0 | 0 | 0 | 0 |
| carboxylated emulsions-SBR according comparison example 9 | 0 | 70 | 0 | 0 | 0 |
| carboxylated solution-SBR according Example 8 | 0 | 0 | 70 | 0 | 0 |
| solution-SBR Buna VP KA 8808 (Bayer) | 0 | 0 | 0 | 70 | 0 |
| carboxylated solution-SBR according Example 1 | 0 | 0 | 0 | 0 | 96.25 |
| Polybutadiene Buna CB 25 (Bayer AG) | 30 | 30 | 30 | 30 | 30 |
| silica Vulkasil (Bayer AG) | 70 | 70 | 70 | 70 | 70 |
| carbon black Corax N 121 (Degussa) | 10 | 10 | 10 | 10 | 10 |
| stearic acid | 1 | 1 | 1 | 1 | 1 |
| zinc oxide RS (Bayer AG) | 2.5 | 2.5 | 2.5 | 2.5 | 2.5 |
| aromat. mineraloil Enerthene 1849-1 (BP) | 37.5 | 37.5 | 37.5 | 37.5 | 11.25 |
| ati ageing agent Vulkanox 4020 (Bayer) | 1 | 1 | 1 | 1 | 1 |
| Bis-(triethoxisilylpropyl)-tetrasulfid Si 69 (Degussa) | 6 | 6 | 6 | 5.6 | 5.6 |
| the following were admixed on a roller: | | | | | |
| sulfenamide accelerator VulkacitCZ (Bayer) | 1.8 | 1.8 | 1.8 | 1.8 | 1.8 |
| guanidine accelerator Vulkacit D (Bayer) | 2 | 2 | 2 | 2 | 2 |
| sulfur | 1.5 | 1.5 | 1.5 | 1.5 | 1.5 |
| mixture viscosity ML 1 + 4 (100° C.) | 59 | | 73 | 47 | 71 |
| the mixtures were subsequently vulcanised at 170° C. Vulcanisation time 20 minutes Properties of the vulcanisates: | | | | | |
| stress at 100% elongation (Mpa) | 3 | 2.9 | 4.3 | 2.2 | 2.7 |
| stress at 300% elongation (Mpa) | 10.8 | 15 | 16.1 | 8.2 | 12.5 |
| tensile strength (Mpa) | 16.4 | 19.3 | 15.7 | 16.1 | 17.6 |
| elongation at break (%) | 410 | 365 | 290 | 460 | 390 |
| hardness at 23° C. (Shore A) | 70 | 71 | 66 | 67 | 61 |
| rebound resilience at 23° C. (%) | 28 | 49 | 28 | 40 | 43 |
| rebound resilience at 70° C. (%) | 48 | 58 | 55 | 54 | 62 |
| difference between rebound resilience at 23° and 70° C. | 20 | 9 | 27 | 14 | 19 |
| tan delta 0° C. | 0.431 | | 0.637 | 0.317 | 0.357 |
| tan delta 60° C. | 0.124 | | 0.089 | 0.121 | 0.072 |
| abrasion (DIN 53 516) | 90 | 55 | 68 | 103 | 68 |

The test results verified the enhanced level of the dynamic properties (higher damping at 0° C. for better wet grip, lower damping at 60° C. for lower rolling resistance of tires, measured as rebound resilience) in comparison to the unmodified solution rubber and particularly in comparison to the carboxylated emulsion SBR-rubber and substantially improved abrasion behaviour in comparison to the unmodified solution rubber.

Example 12

The following substances were mixed in a 1.5 liter kneader (speed of rotation 60 rpm, filling ratio 65%, initial temperature 70° C., duration 5 minutes). The mixtures were subsequently removed and sulfur and accelerator were admixed on a roller at a roller temperature of 40° C.

|  | Comparison 12 | Example 12.1 | Example 12.2 |
|---|---|---|---|
| Mixture Constituents | | | |
| The following were mixed in the 1.5 liter kneader | | | |
| Solution SBR Buna VSL 5025-1 (Bayer AG) | 60 | 0 | 0 |
| Carbox.-solution SBR according to Ex. 2 | 0 | 60 | 0 |
| Carbox.-solution SBR according to Ex. 3 | 0 | 0 | 60 |
| Buna CB 25 polybutadiene rubber (Bayer AG) | 40 | 40 | 40 |
| Vulkasil S hydrated silica (Bayer AG) | 70 | 70 | 70 |
| Corax N 121 carbon black (Degussa) | 10 | 10 | 10 |
| stearic acid | 1 | 1 | 1 |
| Zinc oxide RS (Bayer AG) | 2.5 | 2.5 | 2.5 |
| Enerthene 1849-1 aromat. mineral oil (BP) | 37.5 | 37.5 | 37.5 |
| Vulkanox 4020 anti-aging agent (Bayer) | 1 | 1 | 1 |
| Si 69 bis-(triethoxisilypropyl) tetra-sulphide (Degussa) | 6 | 6 | 6 |
| The following were admixed on the roller | | | |
| Vulkacit CZ sulphenamide accelerator (Bayer) | 1.8 | 1.8 | 1.8 |
| Vulkacit D guanidine accelerator (Bayer) | 2 | 2 | 2 |
| Sulphur | 1.5 | 1.5 | 1.5 |
| Mixture viscosity ML 1 + 4 (100° C.) | 49 | 68 | 63 |
| The mixtures were subsequently vulcanized at 170° C. Vulcanization times: (min.) | 20 | 20 | 20 |
| Properties of Vulcanized Rubber | | | |
| stress at 100% strain (Mpa) | 2.8 | 3.7 | 2.9 |
| stress at 300% strain (Mpa) | 10.8 | 14.4 | 12.7 |
| tensile strength (Mpa) | 15.6 | 16.8 | 18.3 |
| elongation at break (%) | 390 | 340 | 390 |
| hardness at 23° C. (Shore A) | 69 | 68 | 66 |
| rebound resilience at 23° C. (%) | 35 | 33 | 34 |
| rebound resilience at 70° C. (%) | 52 | 55 | 55 |
| abrasion (DIN 53 516) | 68 | 52 | 58 |

The test results verified the enhanced level of mechanical properties of the properties was verified in particular by the higher stress values at 100% and 300% elongation, by the higher tensile strength, by the superior dynamic damping behavior (higher damping at 0° C. for better wet slip resistance, lower dynamic damping at 60° C. for lower rolling resistance of motor vehicle tires, measured as the rebound resilience), and by the improved abrasion properties.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Rubber compounds consisting essentially of at least one rubber and 10 to 500 parts by weight of a filler with respect to 100 parts by weight rubber, wherein said rubber has been produced by the polymerization of aromatic vinyl monomers with diolefins in solution and by the introduction of carboxyl groups, said rubber has a content of 0.1 to 3% by weight of bound carboxyl groups or salts thereof, a content of aromatic vinyl monomers incorporated by polymerization of 5 to 40% by weight, and a content of diolefins of 60 to 95% by weight, and wherein the content of 1, 2-bonded dialefins (vinyl content) is 5 to 60% by weight, with respect to tohe solution rubber used in each case.

2. Rubber compounds according to claim 1, wherein said rubber compounds contain 20 to 200 parts by weight of said filler with respect to 100 parts by weight of rubber.

3. Rubber compounds according to claim 1, wherein said rubber compounds have a content of bound carboxyl groups or salts thereof of 0.2 to 2.5% by weight.

4. Rubber compounds according to claim 1, wherein said rubber has a content of aromatic vinyl monomers incorporated by polymerization of 5 to 30% by weight and a content of diolefins of 70 to 95% by weight, wherein the content of 1,2-bonded diolefins (vinyl content) is 5 to 55% by weight.

5. A process for producing rubber compounds comprising polymerizing aromatic vinyl monomers with diolefins in solution, introducing the carboxyl groups or salts thereof into the solution rubber, and after the completion of the polymerization and of the introduction of the carboxyl groups or salts thereof, the solution rubber, which is present in corresponding solvents, is mixed with 10 to 500 parts by weight of a filler with respect to 100 parts by weight rubber and the solvent is simultaneously or subsequently removed with hot water and/or steam at temperatures of 50 to 200° C., optionally under vacuum.

6. A process according to claim 5, wherein said rubber has a content of 0.1 to 3% by weight of bound carboxyl groups or salts thereof, a content of aromatic vinyl monomers incorporated by polymerization of 5 to 40% by weight, and a content of diolefins of 60 to 95% by weight and wherein the content of 1,2-bonded diolefins (vinyl content) is 5 to 60% by weight, with respect to the solution rubber used in each case.

7. Highly reinforced rubber moldings comprising rubber compounds consisting essentially of at least one rubber and 10 to 500 parts by weight of a filler with respect to 100 parts by weight rubber, wherein said rubber has been produced by the polymerization of aromatic vinyl monomers with diolefins in solution and by the introduction of carboxyl groups, said rubber has a content of 0.1 to 3% by weight of bound carboxyl groups or salts thereof, a content of aromatic vinyl monomers incorporated by polymerization of 5 to 40% by weight, and a content of diolefins of 60 to 95% by weight, and wherein the content of 1, 2-bonded diolefins (vinyl content) is 5 to 60% by weight, with respect to the solution rubber used in each case.

8. Highly reinforced rubber moldings according to claim 7, wherein said moldings are for tires.

* * * * *